Dec. 8, 1959  J. J. DUGAS  2,915,802
METHOD OF MAKING EXPANDED CELLULAR CEMENT PRODUCTS
Filed Nov. 6, 1953
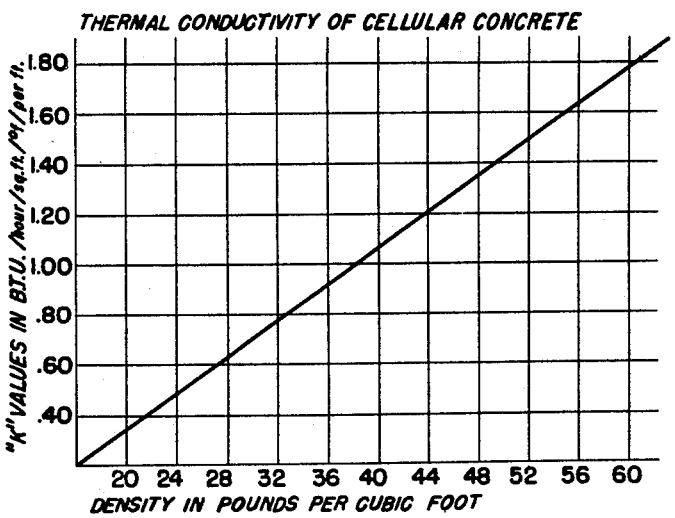
Fig. 1
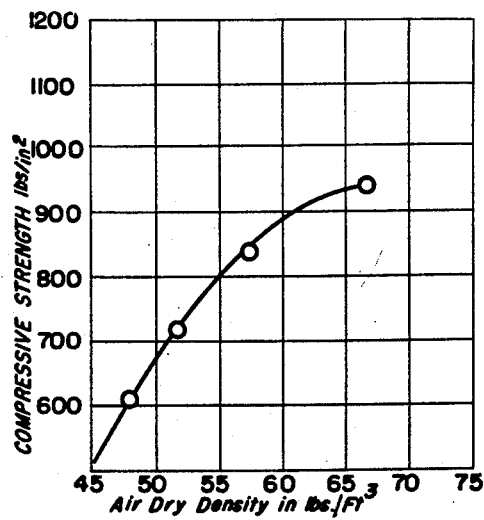
Fig. 2
Fig. 3
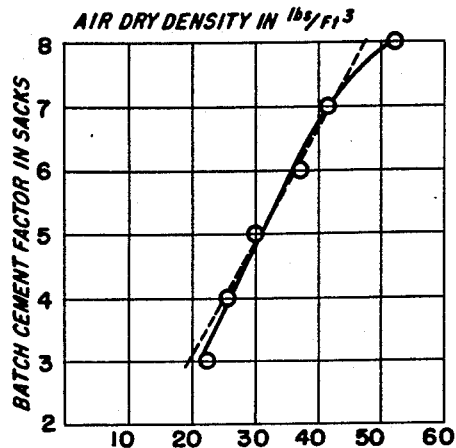
Fig. 4
Joseph J. Dugas
INVENTOR.
BY
Attorneys United States Patent Office 2,915,802
Patented Dec. 8, 1959

2,915,802

METHOD OF MAKING EXPANDED CELLULAR CEMENT PRODUCTS

Joseph J. Dugas, New Orleans, La., assignor to Higgins, Inc., New Orleans, La., a corporation of Louisiana Application November 6, 1953, Serial No. 390,652

3 Claims. (Cl. 25—155)

This invention relates to a gas expanded cellular cement product of the type described in the earlier application Serial No. 23,876 of George H. Johnson and Roland C. Higgins now patent No. 2,560,871.

Gas expanded cellular cement has been occasionally prepared and a number of propositions has been made in order to obtain such a product. But, until the process according to the aforementioned earlier patent to Johnson and Higgins had been developed, such a cement could only be used in a very limited way. The cause for such a limitation was the unpredictability of the characteristics of the product and the non-uniformity of the product which was obtained by the earlier mixing processes.

In the said earlier patent to Johnson and Higgins a method has been described by means of which particular results which are uniform and which impart to the product certain well known characteristics are obtainable. However, this earlier patent describes a method for obtaining a product of fixed characteristics, while it has been found desirable to use a gas expanded cellular cement product under widely varying conditions which entail also the adjustment of its density, its compressive strength and its other characteristics to the use and to the specific conditions of the structure within which the said cement product has been employed.

It is therefore an object of the invention to provide a gas expanded cellular cement product the density of which may be determined in advance and is controllable and which may be adjusted in accordance with the intended use or application of the product, this product being however in general of an extremely low specific weight per volume unit when compared with other cement products while showing an unusually high heat insulating value and a compressive strength per square inch which exceeds practically that of all other materials on a concrete or cement base of a comparable weight.

It is a further object of the invention to provide a gas expanded cellular cement product which is of uniform structure in every respect so that not only the average density is approximately uniform, but also the density of the distribution of the cementitious material, as well as the size and the distribution of the air or gas filled cells within said material is of high uniformity.

It is a further object of the invention to provide a material of very low heat absorption which may be poured in fluid condition on the ground and may form directly on the ground a layer of predetermined thickness which may serve as a road or as a runway or as a sidewalk or the like and which forms an uninterrupted stretch without joints adhering to the ground along its entire undersurface, which needs no expansion joints through which water may get behind the concrete slabs laid on the ground which usually leads to a deterioration and destruction of the layer within a comparatively short time.

It is a further object of the invention to provide a gas expanded cellular cement product the physical characteristics of which are controllable and are variable, but which always forms, whatever the characteristics which are predetermined and selected, a material of highest uniformity and of high initial strength and hardness which is fireproof, moisture-proof, vermin-proof, and which can be nailed or sawed or can be engaged by screws and other means of fixation.

A further object of the invention consists in providing an expanding cellular cement product which, whatever its density, is always heat insulating to a high degree and shows little heat absorption so that expansion under climatic temperature differences is negligible.

Further and more specific objects of the invention will become apparent from the following specification.

The cementitious mixture used according to the present invention comprises Portland cement, water, aluminum flakes, caustic soda, and bituminous emulsion.

The Portland cement can be a standard grade or a high early strength or air entraining cement.

The aluminum flake is preferably of fine particle size and unpolished, the type being however preferably selected in accordance with the specific mix.

The caustic soda is commonly employed in flake form but may also be employed in the form of a solution for the purposes of reaction.

The bituminous emulsion above mentioned contains mainly asphaltic material, an emulsifying agent and water. The emulsifying agent is preferably neutral in hydrogen ion concentration.

In the accompanying drawings four diagrams are shown illustrating the relations which permit to use the method according to the invention for the regulation of the characteristics of the products sought to be obtained.

Figure 1 shows a diagram illustrating the result of tests conducted with respect to thermal conductivity.

Figure 2 is a diagram illustrating the results of tests showing the relationship found to exist between density and compressive strength of various samples.

Figure 3 is a diagram showing the relationship between compressive strength and the quantity of Portland cement in a batch (batch factor).

Figure 4 is a diagram showing the relationship between density and the quantity of Portland cement in each batch.

In order to understand the invention more fully the standard process of forming a gas ezpanded cellular concrete material will be described in detail. While good results may be obtained in several ways it has been established by experiment that best results are obtained by following a predetermined order of adding the ingredients. It has also been found that it is necessary, in order to obtain good results, to use a special type of mixing equipment in order to produce a most vigorous mixing which is much more thorough and energetic than the mixing obtained in the usual type of mixing machine. Also the mixing time must be carefully regulated. The standard process as described in the aforementioned patent consists in adding the bituminous emulsion to water and in thoroughly mixing them. Then Portland cement in the quantity below stated is added and the mixture is mixed very vigorously and violently in the mixing machine described for instance in my earlier patent No. 2,513,012, the mixing time being preferably about two minutes. The mixing machine, such as described in the said earlier patent, produces a much more violent agitation and a much more thorough mixing than the conventional mixing machines produce.

Thereafter the fine aluminum flake is added and the resulting mixture is again mixed violently for about one-half minute. Now the sodium hydroxide is added and the resulting mixture is again mixed vigorously and violently for about one-half minute until the point of "incipient gelation" is reached. This is a point of transition from the liquid state to a markedly viscous state in which the mixture begins to acquire a small but finite yield value. In this state enough viscosity is shown by the mixture to keep the discrete bubbles separate, but not enough viscosity to prevent the growth of the said bubbles. After this "incipient gelation" has been obtained the mixture is poured into suitable forms, for instance, into the forms which are used for constructing a house or any component parts thereof. The mixture may also simply be poured as is the case when roads, sidewalks, runways or the like are constructed.

When the ingredients are mixed, hydrogen is developed by the reaction of the caustic soda with the aluminum. Therefore hydrogen bubbles are formed which remain discrete within the mass and which cause the mass to swell in volume. These bubbles retain their identity during the setting of the cement and the final product is therefor an expanded cement mixture containing minute cavities, asphalt distributed throughout the mixture, and a proportion of free water.

The mixing and pouring should be done at temperatures above 50° F. for best results.

The critical time in the mixing operation is that between the addition of the aluminum and the pouring which time should be not less than one minute and should be not more than five minutes under normal temperatures of between 60° F. and 90° F. The temperature has no influence on the mixing time but affects the speed with which the resulting mixture rises and with which the chemical action takes place.

After the cement mixture has been poured either on the ground or into forms it expands in volume to about 2¼ times its original volume. The density of the product is of course lowered by such expansion but it is to be noted that the amount of expansion is approximately the same regardless of the density of the end product.

The functions of the various materials may be explained as follows:

The Portland cement reacts with a portion of the water to form the complex hydrate of the set cement. Probably a portion of the cement also reacts with the aluminum and caustic soda present to develop hydrogen, but this reaction is relatively insignificant since the amount of caustic soda present is considerably larger than the amount required to exhaust the aluminum. The remaining portion of the water remains uncombined in the mass. An excess of water over that of the combination is necessary in order to provide mobility of the mix prior to pouring.

The aluminum flake is introduced in order to react with the caustic soda and water, thus generating hydrogen for expansion of the mass leaving sodium aluminate. Since the aluminum is present in less than combining proportion, and since no aluminum appears in the final product, it is likely that the aluminum is completely exhausted in the reaction.

The principal function of the caustic soda is, of course, to react with the aluminum and water to form hydrogen and sodium aluminate. However, the casutic soda has also a secondary function insofar as it assists in the formation of the final product by controlling the initial set of the Portland cement. Further, to a certain small extent it also contributes to the stimulation of the reaction by increasing the heat which is generated. It is also probable or at least possible that it enters the reaction between the cement and the water.

The introduction of sodium hydroxide is of primary importance for the structure of the product. Commonly, calcium hydroxide is used in cement mixtures but it was found by actual tests that the sodium hydroxide is by far superior to the calcium hydroxide. If the mixture is made with calcium hydroxide the structure which is obtained is poor and undesirable because it is non-uniform and the material slumps badly before setting. Through the introduction of sodium hydroxide however, uniformly sized and distributed cells are obtained. Thus the selection of sodium hydroxide has a very definite effect on the structure which makes the cement product usable for the purposes above stated. Further the sodium hydroxide also has a solvating action on the Portland cement helping to change the consistency of the mix to that required to produce a uniform structure without slumping or bleeding. The sodium hydroxide attacks the raw Portland cement to an extent which is far greater than calcium hydroxide and this probably is the reason for the outstanding advantages of the sodium hydroxide.

The bituminous emulsion has several functions. It improves the consistency of the mix and prevents coalescence of the hydrogen bubbles thus resulting in a more finely grained and uniform structure which has less tendency to settle and to slump than any structure from which the bituminous emulsion is omitted. The mechanical properties are improved for this reason. The bituminous material also reduces the brittleness of the final product and makes the structure water-proof.

In the above cited Patent No. 2,560,871 the proportions of the material used were stated and it was stated that they are indispensable to obtain a cellular and gas expanded cement product showing a uniform structure. However, it was found by further tests that even with strictly adjusted proportions of the materials used the compressive strength varied greatly. By investigating this phenomenon it was found that the essential qualities were completely controllable by the size of the batches which had been treated and especially by the size of cement introduced into each of the batches. The proportionality between these factors will be seen in the following examples.

In a first example the standard mix is made using 40 gallons of water for one gallon of bituminous emulsion containing 55% of asphalt material. This mixture is supplied to a container to which 8 sacks each weighing 94 lbs. of Portland cement are added. This mixture is then agitated violently, preferably using a fluid jet under pressure, paddles and other means in order to produce a most violent but most thorough commotion and mixture. A special mixer of the type described in my earlier Patent No. 2,513,012 may be used.

Then .7 lb. of fine aluminum flake is added and the resulting mixture is again violently agitated and mixed for about thirty seconds.

Thereafter 1.4 lb. of sodium hydroxide is added and again a violent mixture for a time of about thirty seconds takes place.

By this time the point of "incipient gelation" has been reached, that is the point in which the viscosity has increased to such a degree that a finite yield value can be observed.

Slabs thus produced were tested, taking 8-inch cubes, and testing them in the customary manner on the customary testing machines. An average compressive strength of 433 lb./sq. in. in the direction from top to bottom and an average compressive strength of 757 lb./sq. in. when tested from side to side was found.

When making walls it was found that it is necessary to make the wall in consecutive stages pouring several batches one after the other into the forms. When testing the compressive strength of the wall at different points it was found that the compressive strength under these circumstances varies somewhat.

In the first stage of making a wall, the batch which has been made goes to the bottom of the form and shows a higher compressive strength than that part of the wall which is made in a second stage and in a third stage during which successive batches have been produced and have been poured on top of the mixture supplied in the first batch. It was for instance found that average compressive strength at the bottom or for the first batch was 925 lb./sq. in. while the average compressive strength in the third stage corresponding to the third batch was only 718 lb./sq. in. Likewise, also the density varied in the samples taken from the top section and from the bottom section. The density of the bottom section was 67 lb./cu. ft. while the density of the top section was 52 lb./cu. ft.

It is therefore not advisable if certain definite compressive strengths have to be maintained at points of different heights to rely on the average values of compressive strength in the way in which this is normally done in connection with other building materials. However, the builder may, by using the method according to the invention, produce a uniform or nearly uniform compressive strength in the structural element. This may be done by the process according to the invention by increasing the batch factor in successively poured batches which go to build up the structure.

If under exactly the same conditions slabs were made and the wall was made in several stages and the density and compressive strength of the slab and of different points of the wall were compared it was found that there is still a difference between the values obtained in connection with the wall and the values obtained when a slab had been made. The values obtained for a slab are closely related to those obtained for the top section of the wall which is made during the last stage. The value for a slab sample taken under the same conditions as above described were: density 48 lb./sq. in., compressive strength 605 lb./sq. in. The corresponding values for samples of the wall in the top section of the wall were density 53 lb./sq. in., compressive strength 757 lb./sq. in.

A density-compressive strength curve may therefore be drawn which is shown in Figure 2 and which as seen in the diagram, for the lower densities is a straight line drawn under approximately 45° if the units are suitably selected. With increasing density and for a wall which has been made in many stages the compressive strength deviates somewhat from the strict proportionality and the values are somewhat lower than would correspond to such proportionality.

This fact which has been established now permits to regulate and control exactly the desired compressive strength and/or the density. It has also been found that it is possible to regulate and control exactly the compressive strength and/or density of a wall or slab by preparing batches with different quantities of cement, the quantities of the other substances added to the batch remaining the same. There exists, as will be seen from the following examples, almost strict proportionality between the compressive strength and the quantity of cement used for making up a batch. If a uniform compressive strength is desired in a wall the different wall sections must therefor be made by using different batch factors for the different wall sections.

As an example a number of batches were prepared and thereafter used to build wall sections which were completely uniform with respect to compressive strength and density.

Batch No. 1 was prepared in the manner above indicated with 8 sacks of cement equal to 94 lbs. per batch. Using the same proportions as those used in connection with the 8 sack batch which contains 752 lbs. of cement, but preparing only smaller quantities (equal to ⅛ of the quantity prepared in connection with the 8 sack batch), the batches 2 to 6 were prepared and, while named for the number of sacks which would go into the mixer if a large quantitiy were prepared, they contained in fact only the weight of cement stated for each batch. The proportions of cement, water, aluminum flakes, etc., are however the same throughout all the tests mentioned below.

Batch No. 2 was prepared corresponding to 7 sacks of cement, the actual weight of the cement being equal to 82 lb. of cement per batch.

Batch No. 3 was preparred corresponding to 6 sacks of cement, the weight of the cement being equal to 70 lbs. of cement per batch.

Batch No. 4 was prepared corresponding to 5 sacks of cement, the weight of the cement being equal to 58 lb. of cement per batch.

Batch No. 5 was prepared corresponding to 4 sacks of cement, the weight of the cement being equal to 46 lb. of cement per batch.

Batch No. 6 was prepared corresponding to 3 sacks of cement equal to 34 lb. of cement per batch.

Samples from the wall sections taken from identical points made with the different batches give the following average results:

| Batch No. | Compressive strength, lb./sq. in. | Density, lb./cu. ft. |
|---|---|---|
| 1 | 547 | 53 |
| 2 | 321 | 42 |
| 3 | 281 | 37 |
| 4 | 157 | 30 |
| 5 | 86 | 26 |
| 6 | 79 | 23 |

The values in this table are averages which were obtained by average examples from three different stages from each of the walls, the examples being taken from the top, from an intermediate layer and from the bottom of the walls. The results are represented in the diagram of Figures 3 and 4.

In the example batch No. 6 which showed a somewhat lower compressive strength than expected was therefore not considered. The values of the compressive strength increased in direct proportion to the batch cement factor which is a factor expressing the weight of the Portland cement in each batch preferably in units, such as commonly used, such as sacks. It is thus possible to produce at will any density or compressive strength by adjusting the weight of the cement in the batch.

As an example the production of a wall of uniform compressive strength of around 280 lbs./sq. in. may be taken which is obtained, as seen by comparing the diagrams Figures 3 and 4, when an average density of 37 lbs./sq. in. is produced.

It is necessary in order to obtain the desired uniformity to produce such a wall in several stages. Let it be assumed that the wall is made in three stages and that the mixture is of such a volume that the material for one stage forms a layer filling about one-third of the structure which may be mixed in a mixer at one time. Then it is seen by the diagrams of Figures 3 and 4 that when making the consecutive batches for the three wall sections or layers, for instance, three batches with the numbers 4, 3, 2 containing 58, 70 and 72 pounds of cement for a batch respectively should be used. Therefore, when preparing the first or ground layer, batch No. 4, when preparing the middle layer batch No. 3 and when preparing the upppermost layer batch No. 2 is used, the batch factor increasing successively from 5 to 7. This produces the desired uniformity with a sufficient approximation so that the compressive strength and/or thermal conductivity, as will be seen below, is very approximately the same for the entire structure.

This result seems to be in contradiction with the dependence normally to be expected, of the compressive strength on the quantity of the cement binder added. However, as explained above, the density, compressive strength and thermal conductivity of the cellular material has proved to be dependent in the first place on the size and number of the gas cells. The gas cell formation is, however, dependent on the pressure exercised before and during the setting of the mixture, an increased pressure producing gas cells of smaller size and greater numbers. Thus the lowermost layer of a wall exposed to the full weight of the layers above has a greater density in compressive strength than the same layer in another position. On the other hand a higher content of Portland cement also produces gas cells in greater number and smaller size.

The uniformity in the compressive strength and density in the wall is thus produced by using the pressure due to weight in the lower layers and the influence due to Portland cement in the higher layers.

This method has particular advantages where, for instance, the compressive strength or the thermal conductivity has to vary in accordance with local conditions, requiring, when other methods are used, separate structures whenever a change in desired compressive strength occurs; at least a separate reinforcement has to be added. Such a case, for instance, occurs when a tube insulation produced as a monolithic structure is to be made for a tube which is supported on the ground at some places but has to be supported in the air by brackets or pillars, etc. at other places.

The tube insulation may still be made as a single monolithic insulating tube cover, but for the section which is supported on the ground a batch No. 5 corresponding to a batch factor 4 with 46 lbs. of cement per batch may be used, while for the stretch on which the tube must support itself or must even support another structure and which requires a compressive strength of around 300 lbs./sq. in. the batch No. 3 which contains six unit bags of cement of 82 lbs. per batch is used. The process of producing the insulating material continues uninterruptedly with the sole difference that the number of sacks poured into the mixture is changed.

A number of tests have then been conducted in order to ascertain the thermal conductivity of the gas expanded cellular cement obtained. It was found that also in this case exact proportionality exists between thermal conductivity and density in pounds per cubic feet. The result of these conductivity tests which were conducted, using the method which is that usually termed "guarded hotplate method" and a completely dry specimen is shown in Figure 1.

The diagram shows the ratio of thermal conductivity expressed in B.t.u./hour/sq. ft./° F. per ft. This value is called the "K" value and the diagram represents K values for varying densities. It is seen that there exists strict proportionality between densities and thermal conductivity a ration indicated by the fact that the K values follow a straight line under an angle of 45°.

It is thus possible to obtain a value of conductivity or of compression strength by adjusting the weight of Portland cement per batch.

In connection with the values of density which may be given to the slabs, walls or ground covering layers it may be stated that it has been found that the expansion of the mixture poured into forms or poured on ground is practically always the same whatever the density of the cellular concrete.

The possibility of regulating the density of the gas expanded cellular cement and its compressive strength and thermal conductivity within wide limits at will permits to extend materially the field of application of such cement products.

In connection with thermal conductivity it is frequently necessary to construct a structure, such as a wall, of uniform thermal conductivity which has however considerable vertical extension. Likewise, sometimes a tube insulation with varying thermal conductivity or varying compressive strength may be desirable. Using the above explained principles uniformity as well as variations in the desired manner may be obtained. It is to be emphasized that the structure or insulating cover thus obtained is always monolithic without and separating gaps.

The cellular gas expanded concrete prepared as above stated is in the first place suitable for the fabrication of walls, floors, ceilings etc. of buildings and other structures. The adjustability of the characteristics and the low heat adsorption of the material thus prepared makes it possible to use the cellular gas expanded concrete also as a material for building roads and highways, more specifically also as a material for making runways on air fields, sidewalks, patio pavements and the like with which a layer of the concrete material is placed directly on the ground. A specific advantage is obtained when the celllar gas expanded concrete is used in the above mentioned way because the layer on the ground can in this case be monolithic and need not have any expansion joints. Such expansion joints are a source of trouble insofar as they permit atmospheric water to penetrate behind the concrete slabs which penetration leads to deterioration and destruction. Moreover extremely firm complete union between the cellular concrete and the ground with excellent contact between the concrete and the ground may be achieved. The latter effect is mainly obtained by using the method of pouring the concrete directly on the ground without making any slabs or the like which are afterwards laid on the ground. In the fluid condition, for instance when pumped directly from the mixing machine, the cellular concrete forms an excellent material for covering the ground on account of its firm union with the ground which takes place after it is poured and partly because of the expansion which takes place after such pouring. Such a surface covered with concrete may then be used for roads and highways, for pavements, for sidewalks and runways and for many other purposes for which it is necessary to cover the ground with a concrete layer. As a matter of course a reinforcement may be placed on the ground before the concrete is poured, if necessary. Another application accompanied by an adaptation of the method above outlined, and of great practical importance consists in the use of the cement for insulating underground steam and other lines, in which the transmission of heat to and from the line has sometimes to be prevented under varying conditions. A material corresponding to batch 5 or even to batch 6 in Example 3 may be made in the mixer, and poured around the pipes. No special precautions and no wrapping of the pipes is necessary on account of the very low compressive strength to allow for expansion or contraction between designated expansion joints and the cover may therefore be monolithic which is a major and unusual advantage.

A further major advantage in connection with the above described method of insulating pipes consists in the treatment of those sections of the pipes which cross highways or other traffic points. In this case it is merely necessary to increase the density of the insulation using the same mixing machine and the same mixing process, but varying the mixture, so that the method is carried out with another batch number, for instance, with batch number 4 or 3 in Example 3. The insulation then automatically by virtue of the higher compressive strength of the insulation takes care of overhead loads. In the event of changed conductivity of the surroundings, the batch number corresponding to the density which is in accordance with the desired heat conductivity (Figure 1) is selected. The changes in the thickness of the insulation surrounding the pipe line are thus kept at a minimum or can be avoided altogether.

The sole change to be made in this case consists in providing a membrane around the outside of the insulation to keep out moisture.

As above stated, the pipeline is divided into sections, which division, in order to maintain the monolithic character of the insulation, is transitory.

In connection with all applications whether the cellular concrete is used as a building, an insulating or a road material the low thermal expansion and contraction is a main advantage of the material.

The cement product thus obtained has a number of outstanding characteristics which make it especially valuable. Extreme lightness in weight and high insulating value as well as very high strength are among these characteristics. The material may be reinforced in the usual manner or the reinforcing may be produced by one or more metal laths such as for example a pair of laths, one adjacent each surface of the cement product, and held together by suitable spacer elements. When the cement product is so reinforced it has a strength and resistance to shock which is remarkably higher than any known cementitious product of comparable weight and it is usable for floor and roof slabs and multi-story buildings, but equally also, as already stated, for highways, sidewalks and aircraft runways.

One of the main characteristics is the fact that it may be poured into a plurality of forms defining the various walls, ceilings, floors, etc. thereafter permitting the material to expand within the forms and to set. The forms are then removed and all the walls, roof slabs or floor slabs will be completed and in place. The material therefore is especially suitable for the construction of buildings or for the covering of the ground with road material or runways which must go in service within a very short time after construction has started.

It will be apparent that modifications can be introduced without departing from the essence of the invention as defined in the annexed claims.

What is claimed as new is as follows:

1. The method of making a monolithic wall structure consisting of gas expanded cellular cement of substantially uniform compressive strength by pouring into a mold encasing the structure a mixture of water and admix, mixing under violent agitation said admix and water in the proportion of 40 gallons of water to one gallon of said admix, the latter consisting of an aqueous bituminous emulsion containing approximately 55% of asphalt to which Portland cement is added and is mixed under violent agitation, adding a relatively small and exhaustible amount of aluminum flakes, while continuing the mixing under violent agitation for about thirty seconds, and thereafter adding a small but inexhaustible supply of sodium hydroxide and mixing violently until the point of incipient gelation is reached, which method consists in using a mold having a volume accommodating at least 2¼ times the volume of said mixture of admix and water poured into it, in preparing the above mixture in batches of approximately equal volume in successive steps, each batch consisting of the same quantity of aqueous bituminous emulsion, aluminum flakes and sodium hydroxide to which Portland cement in bagged units is added, the weight of each bagged unit exceeding 10 lbs., the number of said units increasing by at least one for every batch poured into the mold on top of a previously prepared batch, the batches poured into the mold producing layers, each layer filling a portion of the total height of the mold, the weight of successively poured layers decreasing the size and increasing the number of gas cells in previously poured layers, while the same effect is progressively produced in successively poured layer poured on top of other layers by the increase of the quantity of Portland cement added to each batch, thus equalizing the density of the wall structure.

2. The method of producing a cementitious structure made of gas expanded cellular cement having a substantially vertical extension and having a substantially uniform heat conductivity by pouring into a mold holding and encasing the structure a mixture of water and an admix, by mixing under violent agitation said admix and water in the proportion of 40 gallons of water to one gallon of said admix, the latter consisting of an aqueous bituminous emulsion containing approximately 55% of asphalt to which Portland cement is added and is mixed under violent agitation, adding a small amount of aluminum flakes, while continuing the mixing under violent agitation for about thirty seconds, and thereafter adding a small but inexhaustible supply of sodium hydroxide and mixing violently until the point of incipient gelation is reached, the reaction between the last-named additions resulting in the formation of gas cells, which method consists in using a mold of a volume which is at least equal to 2¼ times the volume of water and admix poured into the mold, in preparing the mixture of water and aqueous bituminous emulsion in batches, pouring said batches in successive steps, in adding the Portland cement to each batch in bagged units, the weight of each unit exceeding 10 lbs., in filling the mold at the bottom with batches of a mixture containing only a relatively small number of bagged units of Portland cement, forming an essentially horizontal layer, the vertical extension of which is a relatively small fraction of the total vertical extension of the wall structure, in increasing the number of bagged Portland cement units by at least one unit when preparing a batch for a layer successively poured on top of a previously formed layer into the mold, the increase in the number of bagged Portland cement units added to the batch of the successively poured mixture increasing the density of the wall material by reducing the size of the gas cells, but increasing their number, while the same increase of the density is produced in the previously poured lower layers by the action the weight of the layers above them exercises on the layers below, thus producing a substantially vertically extending structure of substantially uniform gas cell size and gas cell number per volume unit with a uniform heat conductivity due to the equalization of the size and number of the gas cells in superposed layers.

3. The method of producing a pipeline insulation of a monolithic type made of expanded cellular cement for pipelines supported on said insulation and running through surroundings requiring an insulation of varying thermal conductivity and of varying mechanical strength, said expanded cellular cement insulation being produced in batches of approximately equal volume by means of a mold surrounding said pipeline, said mold being transitorily divided into sections, each batch being prepared by mixing under violent agitation water and an admix in the proportion of 40 gal. of water to one gallon of the said admix, the latter consisting of an aqueous bituminous emulsion containing approximately 55% of asphalt to which Portland cement is added and is mixed under violent agitation, adding a relatively small and exhaustible amount of aluminum flakes, while continuing the mixing under violent agitation for about 30 seconds, and thereafter adding a small but inexhaustible supply of sodium hydroxide and mixing violently until the point of incipient gelation is reached, which method consists in pouring the batches after mixing in succession into the mold, said mold having a volume which is at least 2¼ times the volume of the water and admix poured into it, in preparing each batch with the same quantity of water and aqueous emulsion, aluminum flakes and sodium hydroxide, in adding the Portland cement in bagged units, the weight of each bagged unit exceeding 10 lbs., in reducing and increasing respectively the number of bagged units added to each batch in order to increase or reduce, respectively, the size of the gas cells and their number which is determined by the number of bagged units of Portland cement, the size and the number of the gas cells determining the density of the expanded cellular cement required to increase the thermal conductivity of a section and the compressive strength of another section of the pipeline, thus producing a monolithic cementitious insulation of substantially the same thickness along the pipeline with sections of increased thermal conductivity and sections of increased compressive strength relatively to other sections, while the dimensions of the insulation are kept approximately uniform along the pipeline.

References Cited in the file of this patent

UNITED STATES PATENTS

| | | |
|---|---|---|
| 1,741,829 | Cuccolo | Dec. 31, 1929 |
| 1,951,344 | Caldwell | Mar. 20, 1934 |
| 2,405,021 | Durant | July 30, 1946 |
| 2,532,587 | Williamson | Dec. 5, 1950 |
| 2,552,090 | Eusner | May 8, 1951 |
| 2,560,871 | Johnson et al. | July 17, 1951 |